US010722825B2

(12) United States Patent
Loshe et al.

(10) Patent No.: US 10,722,825 B2
(45) Date of Patent: Jul. 28, 2020

(54) STRAINER DEVICE FOR WASH WATER USED WITH EQUIPMENT IN THE AGGREGATE AND MINING INDUSTRIES

(71) Applicant: Deister Machine Company Inc., Fort Wayne, IN (US)

(72) Inventors: Dale A. Loshe, New Haven, IN (US); Scott G. Sherbahn, Fort Wayne, IN (US); Jason H. Mayes, Monroeville, IN (US)

(73) Assignee: Deister Machine Company Inc., Fort Wayne, IN (US)

( * ) Notice: Subject to any disclaimer, the term of this patent is extended or adjusted under 35 U.S.C. 154(b) by 183 days.

(21) Appl. No.: 15/797,004

(22) Filed: Oct. 30, 2017

(65) Prior Publication Data
US 2019/0126173 A1  May 2, 2019

(51) Int. Cl.
*B01D 29/00* (2006.01)
*B01D 29/03* (2006.01)
(Continued)

(52) U.S. Cl.
CPC ..... *B01D 29/0097* (2013.01); *B01D 21/0042* (2013.01); *B01D 21/2483* (2013.01); *B01D 21/34* (2013.01); *B01D 29/03* (2013.01); *B01D 29/904* (2013.01); *B01D 33/0376* (2013.01); *B01D 33/463* (2013.01); *B01D 35/16* (2013.01); *B03B 5/04* (2013.01); *B07B 1/46* (2013.01); *B01D 2201/313* (2013.01); *B07B 2201/04* (2013.01); *B07B 2230/01* (2013.01)

(58) Field of Classification Search
CPC ............ B01D 29/0097; B01D 29/0014; B01D 29/03; B01D 29/035; B01D 35/02; B01D 29/05
USPC ......................... 210/305, 306, 320, 456, 447
See application file for complete search history.

(56) References Cited

U.S. PATENT DOCUMENTS 432,793 A * 7/1890 Crocker ................. B01D 35/02
  210/448
1,931,988 A * 10/1933 Hromadka ............. B01D 35/02
  210/306
(Continued)

FOREIGN PATENT DOCUMENTS

CN 204208868 3/2015
CN 105149267 12/2015
(Continued)

*Primary Examiner* — Benjamin M Kurtz
(74) *Attorney, Agent, or Firm* — Faegre Drinker Biddle & Reath LLP

(57) ABSTRACT

An aggregate processing system, including a water source, and a vibrating screen device including a plurality of spray nozzles disposed above a screen for spraying wash water onto aggregate during aggregate processing. A strainer device is provided for removing particulate debris from a water wash stream flowing from a water source to the spray nozzles, the strainer device including a filter screen having an angled shape with a convex side facing the strainer inlet and fluid flow path. The strainer is configured to induce turbulent flow for separation of the particulates by gravity, with the filter screen blocking particulates above a given size. In this manner, particulates which may otherwise lead to clogging of the spray nozzles are removed from the wash water stream.

15 Claims, 9 Drawing Sheets

(51) Int. Cl.
*B01D 29/90* (2006.01)
*B01D 33/46* (2006.01)
*B01D 21/34* (2006.01)
*B01D 33/03* (2006.01)
*B01D 21/24* (2006.01)
*B07B 1/46* (2006.01)
*B03B 5/04* (2006.01)
*B01D 21/00* (2006.01)
*B01D 35/16* (2006.01)

(56) References Cited

U.S. PATENT DOCUMENTS

| | | | | |
|---|---|---|---|---|
| 1,961,498 | A | * | 6/1934 | Krueger ............... B01D 35/02 210/305 |
| 3,556,298 | A | * | 1/1971 | Huebner ............. B01D 29/016 210/131 |
| 4,301,011 | A | * | 11/1981 | Stamm ................ B01D 35/22 210/447 |
| 4,442,003 | A | | 4/1984 | Holt |
| 4,476,021 | A | * | 10/1984 | Souza ................... B01D 35/02 210/248 |
| 5,180,437 | A | | 1/1993 | Anderson et al. |
| 5,297,683 | A | | 3/1994 | Stengel, III |
| 5,944,991 | A | * | 8/1999 | Shellenbarger ........ B01D 29/05 210/232 |
| 6,022,481 | A | | 2/2000 | Blake |
| 6,189,549 | B1 | | 2/2001 | Fontana et al. |
| 7,883,624 | B2 | | 2/2011 | Robert et al. |
| 7,968,020 | B2 | | 6/2011 | Behelfer et al. |
| 2007/0084802 | A1 | | 4/2007 | Hilgren et al. |
| 2011/0068062 | A1 | | 3/2011 | McClelland |
| 2011/0185631 | A1 | | 8/2011 | Subramanian et al. |
| 2016/0129382 | A1 | | 5/2016 | Bloomfield |

FOREIGN PATENT DOCUMENTS

| | | |
|---|---|---|
| CN | 205032038 | 2/2016 |
| CN | 205925422 | 2/2017 |
| CN | 106560257 | 4/2017 |

\* cited by examiner

STRAINER DEVICE FOR WASH WATER USED WITH EQUIPMENT IN THE AGGREGATE AND MINING INDUSTRIES

BACKGROUND

1. Field of the Invention

The present disclosure provides a strainer device for removing particulate materials and other debris from wash water used with equipment in the aggregate and mining industries, such as vibrating screens, for example.

2. Description of the Related Art

In the aggregate and mining industries, mined aggregate is often crushed after extraction, and then is typically processed or sorted by size and/or shape to meet desired specifications. Very fine particulate materials, such as dust, grit and sand, sometimes collectively referred to as "fines", tend to adhere to the crushed aggregate and must be removed in order to properly classify the aggregate.

Vibrating screens, for example, are typically used to remove smaller particulates from aggregates and for classifying aggregates according to size. Vibrating screen devices typically include a frame to which one or more movable or vibrating screens are attached. The screen is movable along an angled reciprocating path or a circular or oval oscillating path, for example, to allow smaller particulate materials to pass through the screen while retaining aggregate of a desired size on the screen.

Wash water is sprayed onto the aggregate during this process via a series of manifolds which each include a set of spray nozzles. Advantageously, the manifolds and nozzles are spaced and arranged such that the wash water substantially uniformly covers the screen and aggregate to wash fines from the aggregate during the separation process.

At industrial mining locations in which vibrating screens and other equipment are used, the wash water is not potable municipal water, but rather is obtained on site from a well or pond, for example, and may include entrained particulate materials such as dirt, fines, or rust scale from the interior of piping, for example. Problematically, these particulates may block or plug the spray nozzles in the manifolds, either outright or via accumulation over time, depending on the size and type of particulate materials.

When multiple spray nozzles eventually become blocked in a given spray system, the distribution of wash water across the screen and the aggregate becomes uneven, necessitating shutdown of the equipment for manual cleaning of the manifolds and nozzles. This results in significant downtime for the equipment as well as significant maintenance personnel expense, particularly in the event when manual equipment access is considered to be a "confined space" and/or when total equipment lockout is required.

What is needed is an improvement over the foregoing.

SUMMARY

The present disclosure provides an aggregate processing system, including a water source, and a vibrating screen device including a plurality of spray nozzles disposed above a screen for spraying wash water onto aggregate during aggregate processing. A strainer device is provided for removing particulate debris from a water wash stream flowing from a water source to the spray nozzles, the strainer device including a filter screen having an angled shape with a convex side facing the strainer inlet and fluid flow path. The strainer is configured to induce turbulent flow for separation of the particulates by gravity, with the filter screen blocking particulates above a given size. In this manner, particulates which may otherwise lead to clogging of the spray nozzles are removed from the wash water stream.

In one form thereof, the present invention provides an aggregate processing system, including a water source; a vibrating screen device including a screen and a plurality of spray nozzles disposed above the screen; a water supply conduit fluidly connecting the water source and the spray nozzles of the vibrating screen; and a strainer device for removing particulate debris from a wash water stream flowing from the water source to the spray nozzles, the strainer device in fluid communication with the water supply conduit and disposed between the water source and the spray nozzles.

In another form thereof, the present invention provides a strainer device for use in removing particulate debris from a wash water stream in an aggregate processing system, the strainer device including a vertically elongate housing including an inlet opening defining a fluid flow path into the housing, the inlet opening in fluid communication with an inlet chamber, an outlet in fluid communication with an outlet chamber; and a filter screen disposed within the housing between, and separating, the inlet and outlet chambers, the filter screen including a plurality of openings and having one of an angled shape and a curved shape, with a convex side and an opposite concave side, the convex side facing the fluid flow path of the inlet opening.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
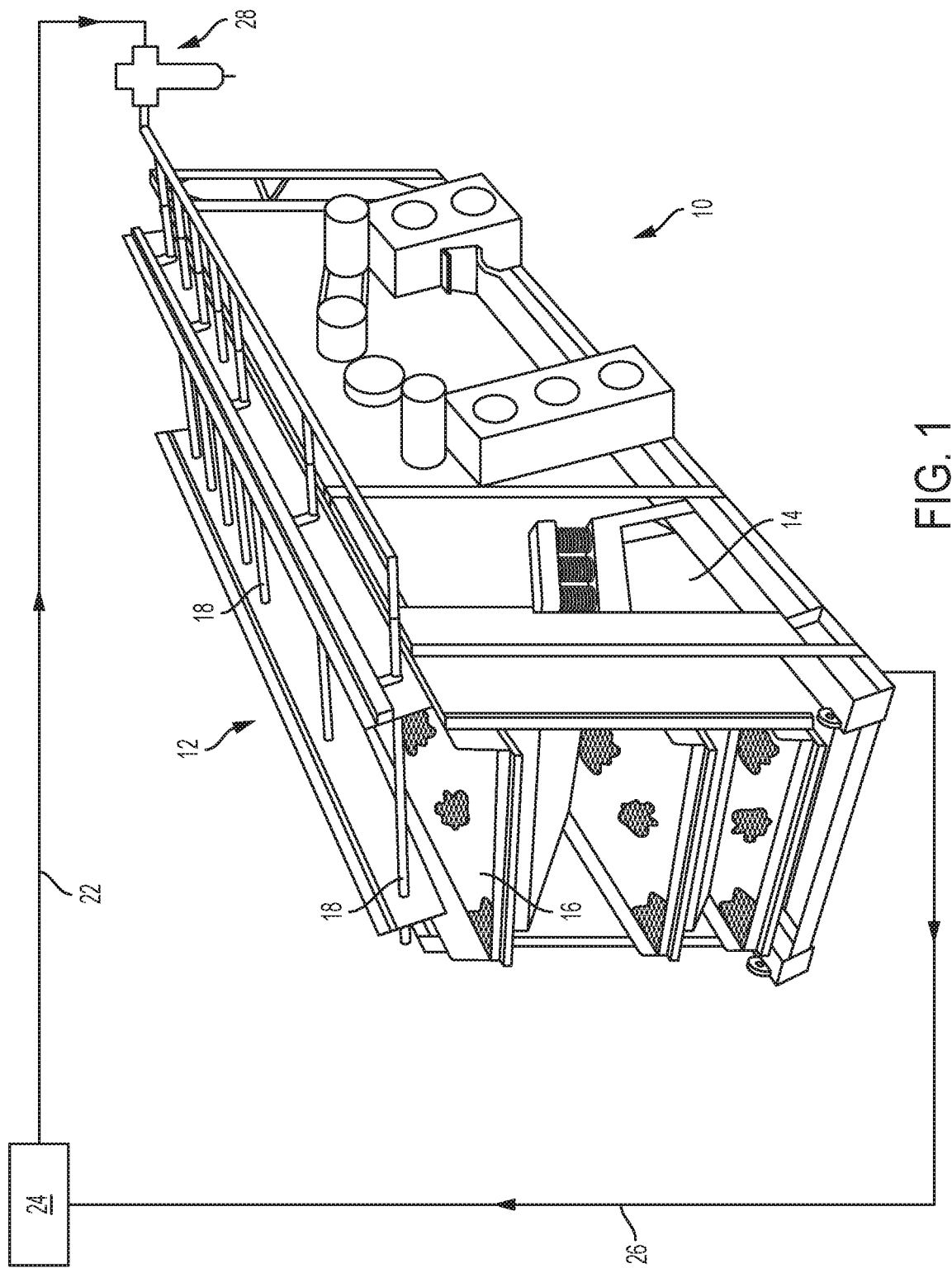
FIG. 1 is a schematic view of an aggregate processing system, showing an aggregate processor in the form of a vibrating screen, together with a water source and wash water supply and return conduits.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise form disclosed.

DETAILED DESCRIPTION

Referring to FIG. 1, an aggregate processing system 10 is shown, which generally includes an aggregate processor, shown in FIG. 1 in the form of a vibrating screen device 12 which includes a frame 14 with one or more screens 16 movably attached to the frame 14 and having a plurality of openings sized to separate aggregate. The aggregate, along with fines adhered to or entrained within the flow of aggregate, is fed to screen 16 via a feeder device (not shown) or other means. Although the aggregate processor is shown herein as a vibrating screen device 12, the present invention may also be used in connection with the supply of wash water to other components of aggregate processing equipment of the type used in the aggregate and mining industry.

Figure 2:
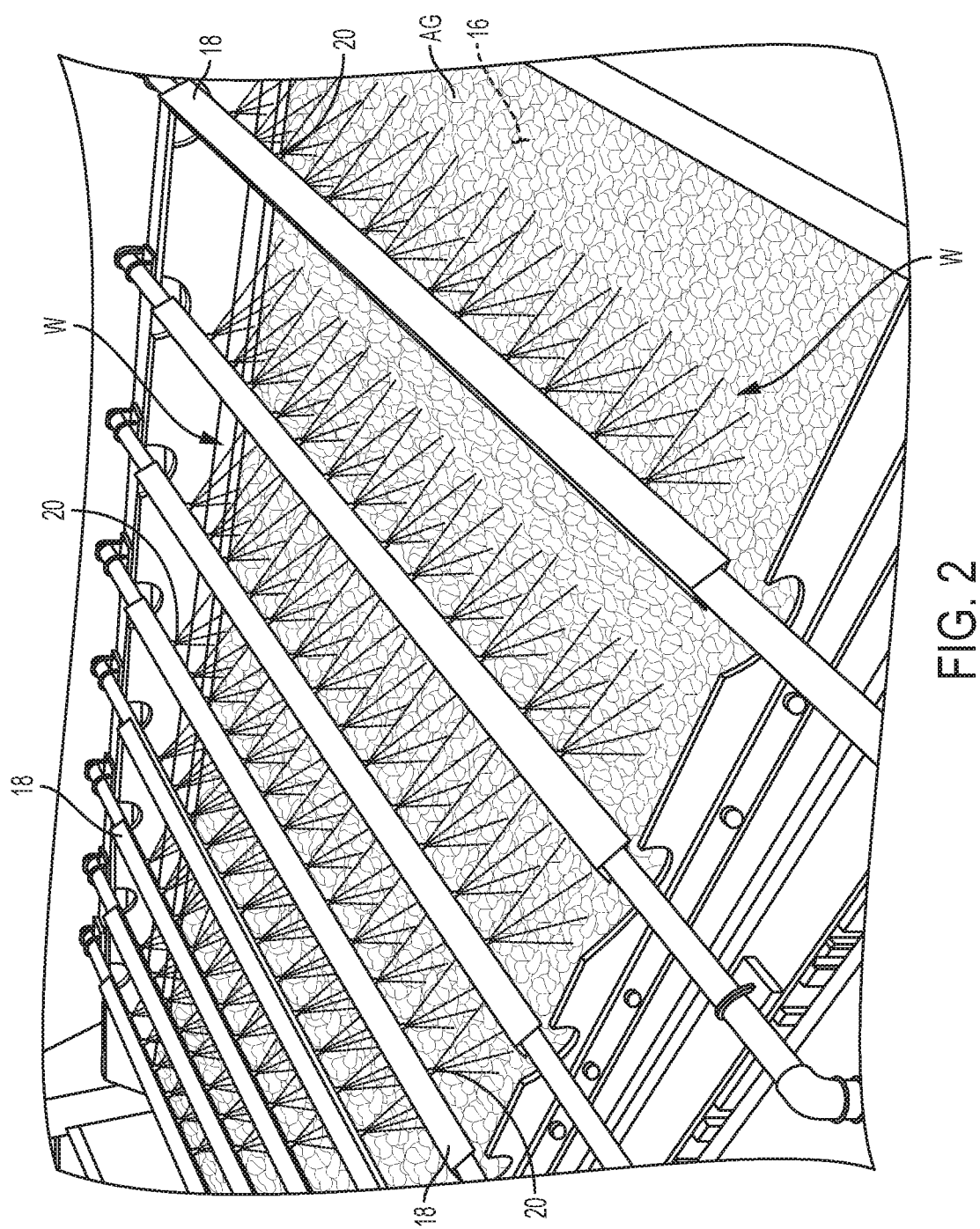
FIG. 2 is a partial overhead view of the vibrating screen of FIG. 1, showing the spraying of wash water onto the aggregate on the screen though manifolds and spray nozzles.

Referring to FIG. 2, wash water W is sprayed onto the aggregate AG on the screen 16 via a plurality of manifolds 18 each including a plurality of spray nozzles 20. Referring to FIGS. 1 and 2, wash water is conveyed to vibrating screen device 12 via supply conduit 22 from a suitable water source 24, such as a well, pond, or river, for example. The wash water may be collected from vibrating screen device 12 and recycled back to water source 24 via return conduit 26 and/or may be used in additional applications downstream of vibrating screen device 12 before being returned to water source 24. According to the present disclosure, a strainer device 28 is fluidly connected within supply conduit 22 at a location between water source 24 and vibrating screen device 12 for removing particulate materials from the wash water flowing through supply conduit 22.

Figure 3:
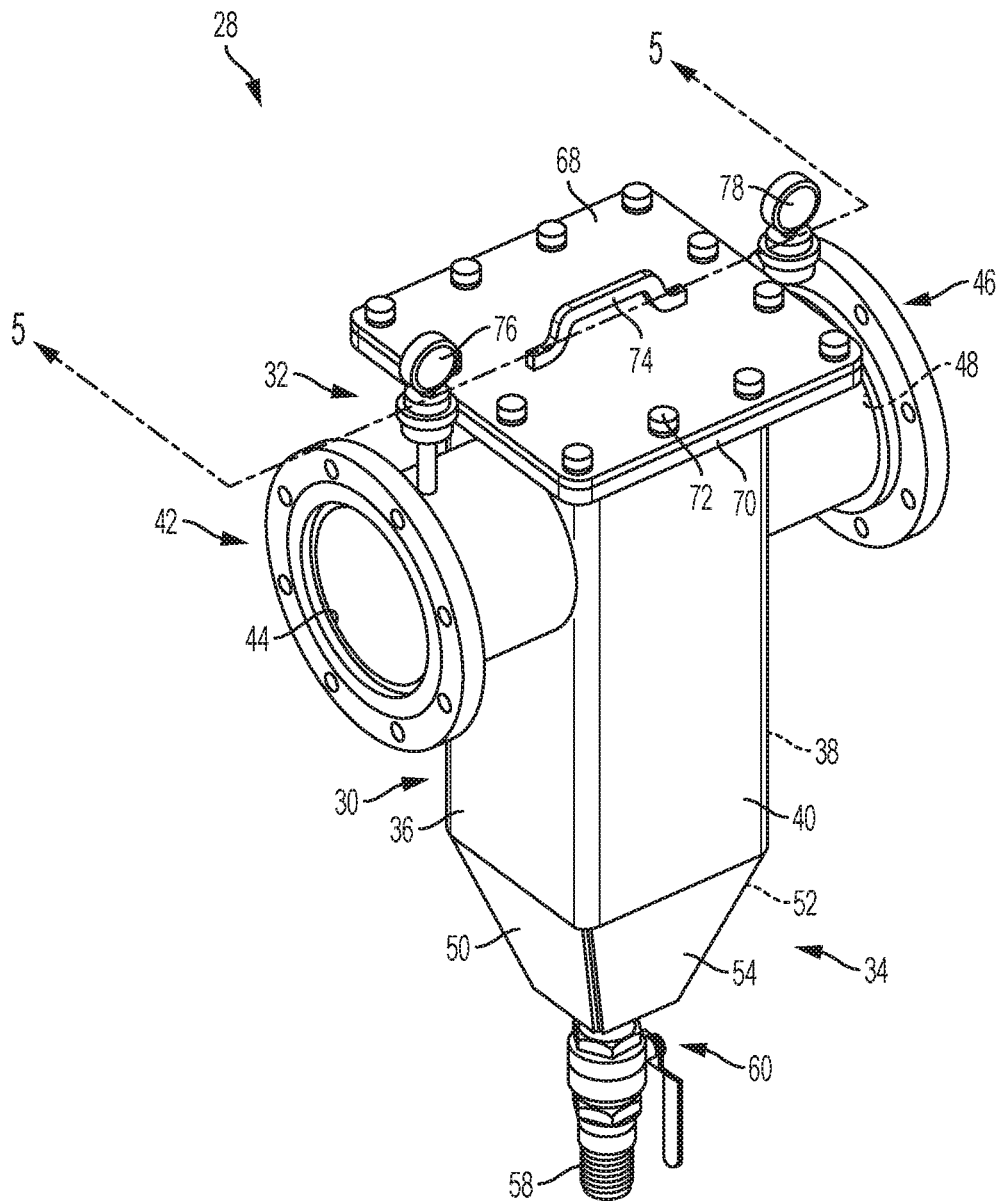
FIG. 3 is a perspective view of a strainer device in accordance with the present disclosure.

Referring to FIG. 3, strainer device 28 generally includes a housing 30 which may have a generally rectangular, vertically elongate shape including an upper end 32 and a lower end 34, as well as front wall 36, rear wall 38, and a pair of opposite side walls 40. Front wall 36 includes an inlet 42 defining an inlet opening 44 and an outlet 46 defining an outlet opening 48. Inlet 42 and outlet 46 are configured as flanged conduit fittings for receiving connected pipes (not shown) via suitable fasteners and seals (not shown). Inlet and outlet openings 44 and 48 are each cylindrical in shape including respective diameters, with inlet opening 44 intersecting front wall 36 and outlet opening 48 intersecting rear wall 38. Inlet and outlet openings 44 and 48 may be oriented coaxially as shown, though such is not required.

Figure 4:
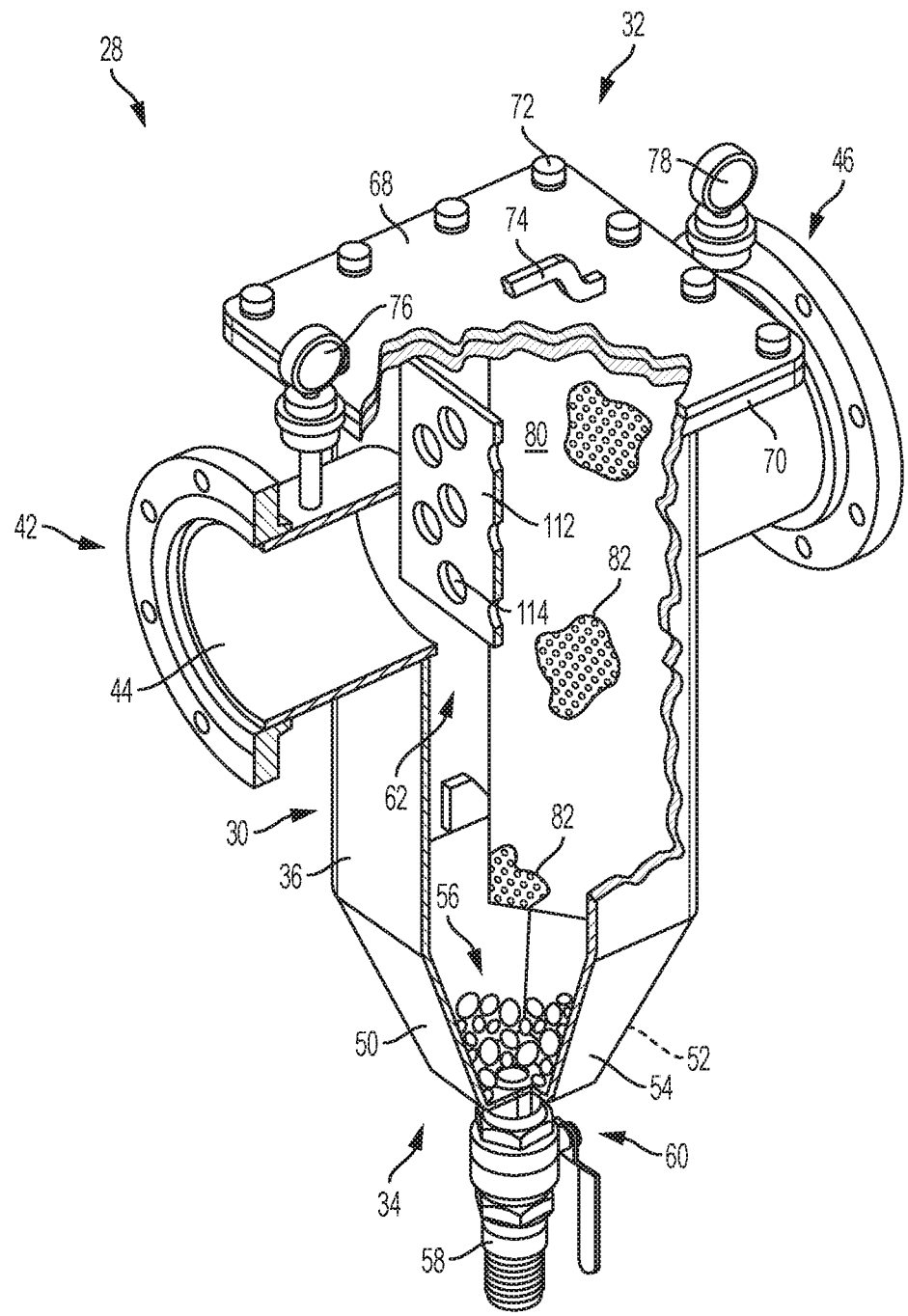
FIG. 4 is a perspective, partial cut away view of the strainer device, showing the filter screen in solid lines.
Figure 5:
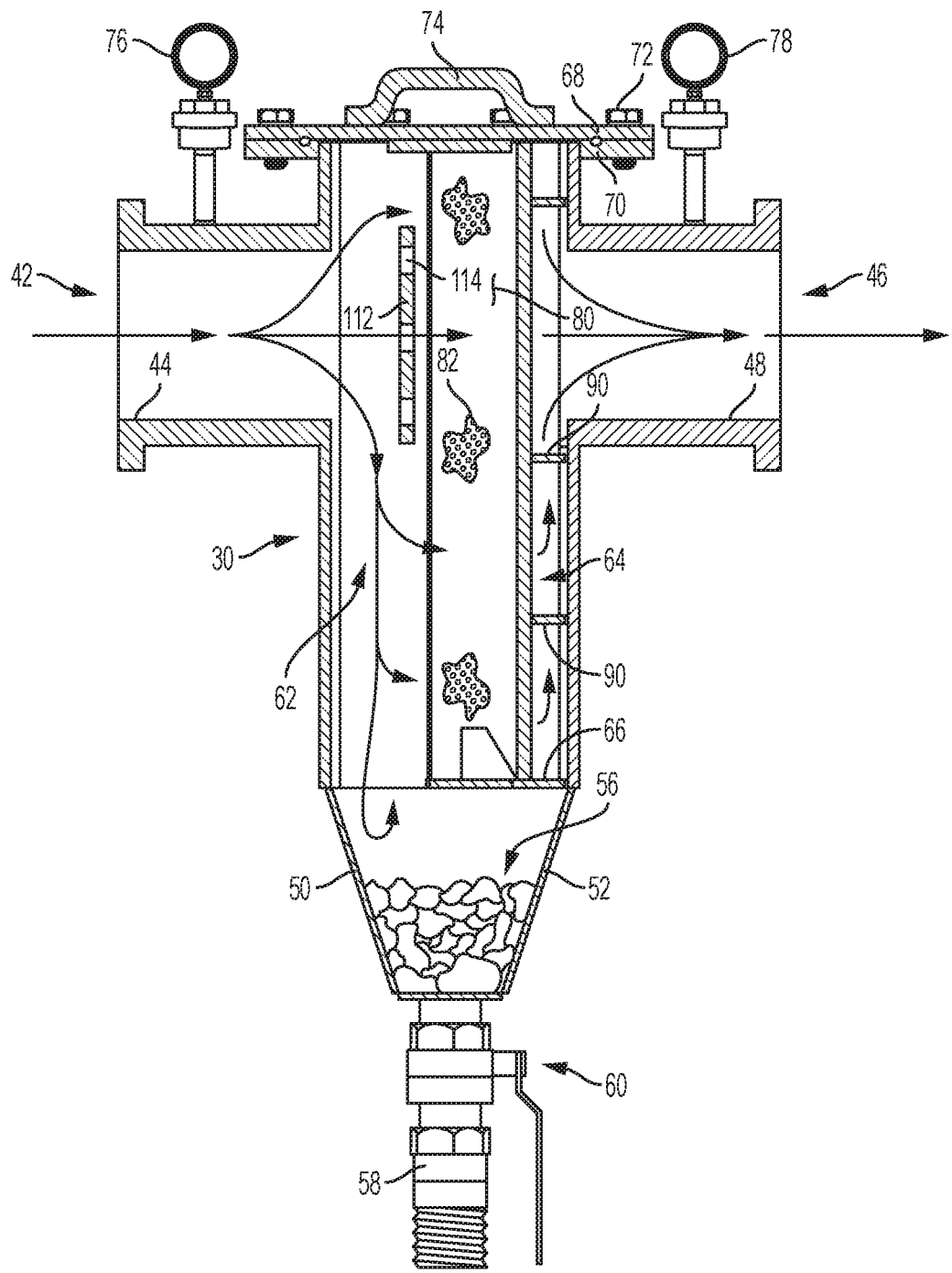
FIG. 5 is a vertical sectional view of the strainer device, taken along line 5-5 of FIG. 3.

Referring additionally to FIGS. 4 and 5, the lower end 34 of the strainer housing 30 includes tapered front 50, rear 52, and opposite side walls 54 which together define a debris chamber 56, together with a purge conduit 58 and purge valve 60, the function of which is described below. Housing 30 also includes an inlet chamber 62 in fluid communication with inlet opening 44, and an outlet chamber 64 in fluid communication with outlet opening 48, with inlet chamber 62 further in fluid communication with debris chamber 56. Outlet chamber 64 further includes a bottom wall 66 disposed generally at a junction between upper and lower ends 32 and 34 of housing 30. Upper end 32 of housing 30 additionally includes a removable lid 68 attached to an upper flange 70 of housing 30 via a plurality of bolts 72, with lid 68 including a handle 74. Due to the vertically elongate shape of housing 30, inlet and outlet chambers 62 and 64, as well as the filter screen described below, may extend downwardly a significant distance below a central axis of inlet opening 44.

Inlet 42 and outlet 46 may each include respective pressure gauges 76 and 78 in fluid communication therewith for indicating a fluid pressure within inlet 42 and outlet 46. When an observed pressure of the gauges 76 and 78 is substantially equal, same indicates a normal condition for fluid flow through strainer device 28, and when a pressure differential is observed between pressure gauges 76 and 78, particularly with outlet pressure gauge 78 registering a pressure lower than inlet pressure gauge 76, same indicates that the filter screen of strainer device 28 is clogged and should be removed and cleaned or replaced in the manner described below.

Referring to FIGS. 4-8, strainer device 28 includes a filter screen 80 received within housing 30, with filter screen 80 disposed between, and separating, inlet chamber 62 and outlet chamber 64. Filter screen 80 has a plurality of circular openings or perforations 82 which each have a diameter as little as $1/16$, $1/10$, or $1/8$ inches, or as great as $1/4$, $1/3$, or $1/2$ inches, or within any range defined between any pair of the foregoing values, such as between $1/16$ and $1/2$ inches, $1/10$ and $1/3$ inches, or $1/8$ and $1/4$ inches, for example. Openings 82 may be circular as shown, though the shape of openings 82 may vary, with the foregoing size ranges of openings 82 corresponding to a major axis when openings 82 are not circular. Openings 82 may be arranged in a grid pattern or in a stagger pattern, for example, on a $3/16$ inch center-to-center stagger as shown. Filter screen 80 may be made of a rigid metallic material such as steel, stainless steel or abrasion resistant (AR) steel, for example, such as 11 gauge steel plate, and filter screen 80 may have a thickness between $1/8$ inch and $1/4$ inch, for example.

Figure 7A:
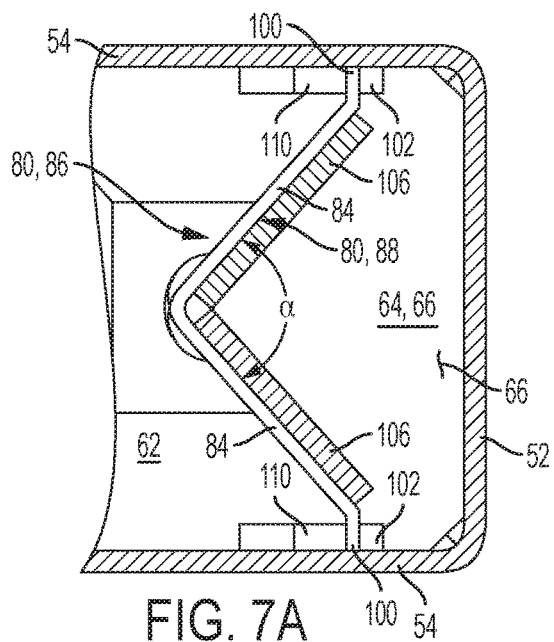
FIG. 7A is a horizontal sectional view, taken along line 7A-7A of FIG. 6A.
Figure 7B:
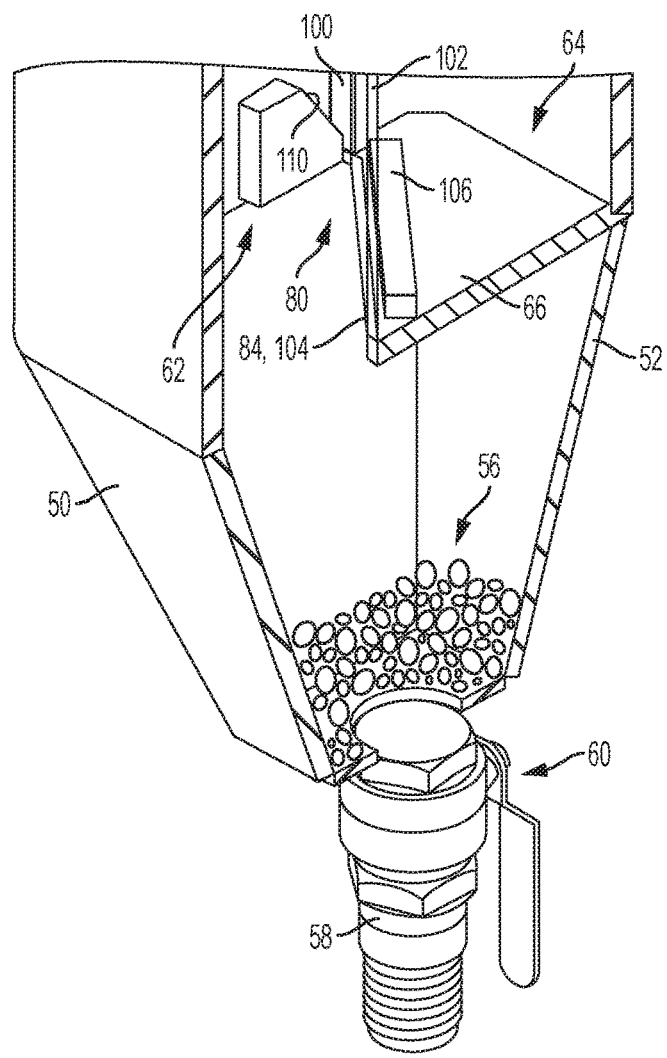
FIG. 7B is a fragmentary view of a portion of FIG. 6A.
Figure 8:
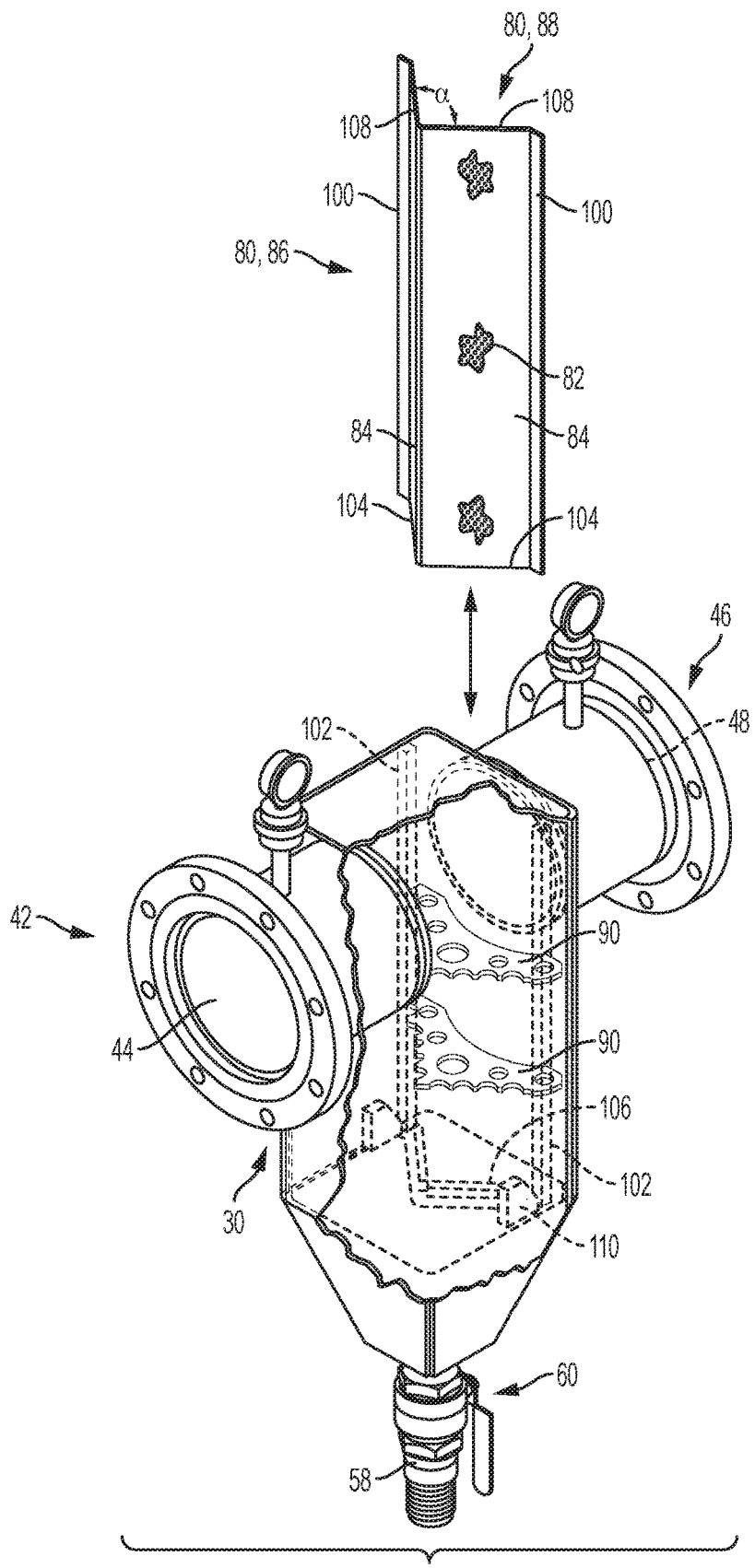
FIG. 8 is an exploded, partial cut away view of the strainer device, showing removal and/or insertion of the filter screen.

Filter screen 80 may be punched, stamped, or otherwise formed from stock material in a planar shape though, as best shown in FIGS. 7A and 8, filter screen 80 is advantageously formed into a bent, V- or angled shape having with a pair of walls 84 disposed at an angle α with respect to one another, which angle may be as little as 60, 75 or 80 degrees or as great as 100, 105, or 120 degrees, or within any range defined between any pair of the foregoing values, such as between 60 and 120 degrees, 75 and 105 degrees, or 80 and 100 degrees, for example. In one embodiment, the angle between walls 84 is about 90 degrees. In this configuration, filter screen 80 defines a convex, or front, side 86 and an opposite concave, or rear, side 88, with convex side 86 disposed in an orientation facing inlet opening 46 and inlet chamber 62 such that convex side 86 of filter screen 80 faces the path of the fluid flow through inlet opening 46 and into inlet chamber 62 as described below.

Figure 9:
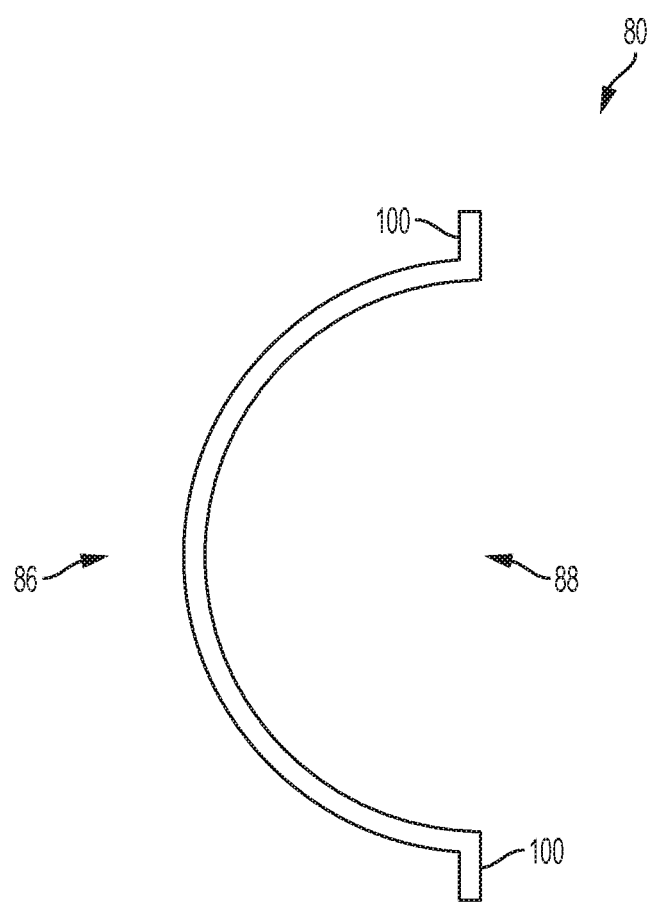
FIG. 9 is a top view of a filter screen having a curved shape.

In another embodiment, shown in FIG. 9, filter screen 80 may be formed in a curved or arcuate shape, extending through a curve between 90 degrees and 180 degrees, for example, with its convex, or front, side 86 facing inlet 42 and its opposite concave, or rear, side 88 facing outlet 46.

Advantageously, the angled or curved shape of filter screen 80, in which convex side 86 is exposed to the fluid flow through strainer device 28, provides resistance to buckling or shape distortion upon exposure of filter screen 80 to significant fluid velocity through inlet opening 46 as well as from impacts of particulate debris within the fluid flow on filter screen 80.

Figure 6A:
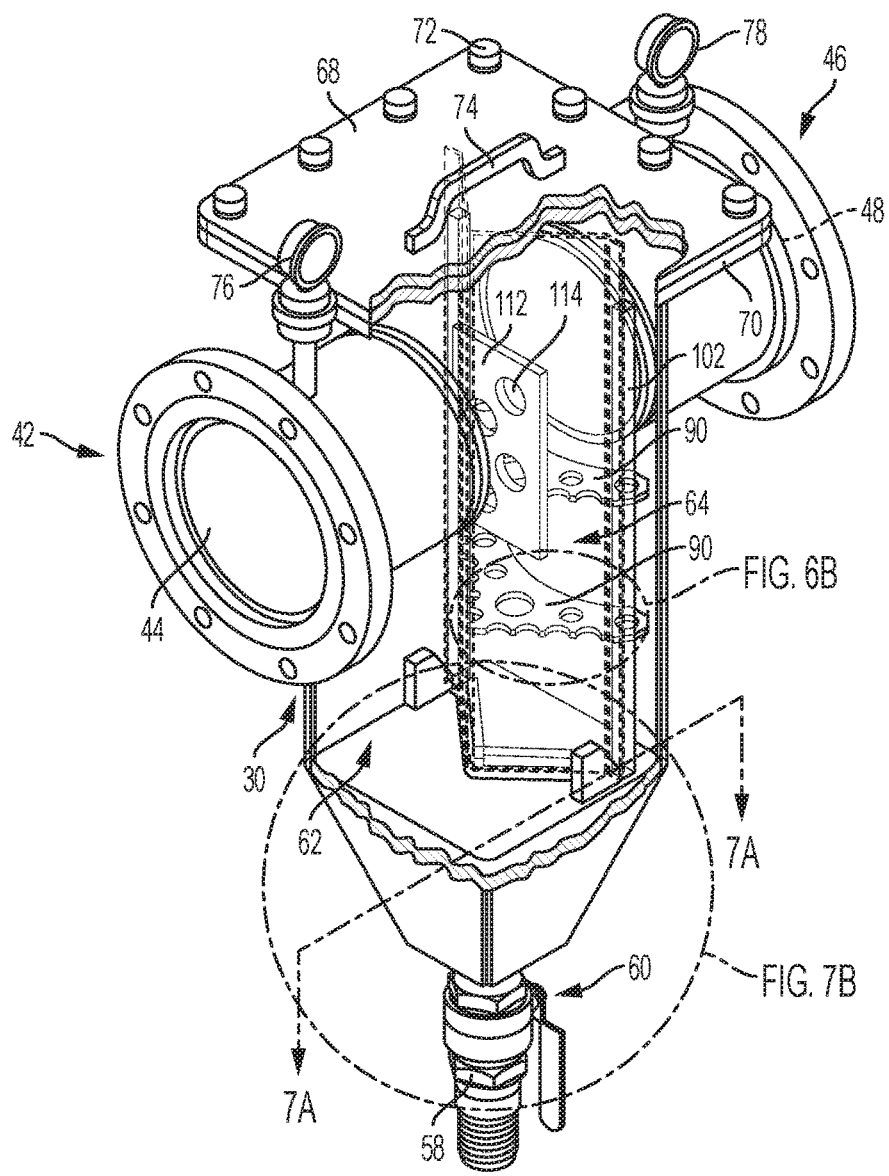
FIG. 6A is a perspective, partial cut away view of the strainer device, showing the filter screen in dashed lines.
Figure 6B:
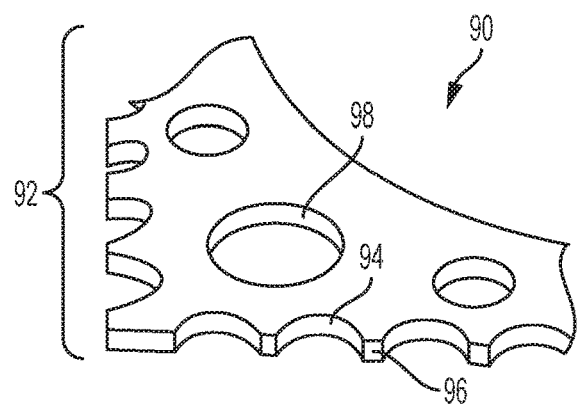
FIG. 6B is a fragmentary view of a portion of FIG. 6A.

Referring to FIGS. 6A, 6B and 8, filter screen 80 may be vertically elongate in shape, and is supported within outlet chamber 64 by a plurality of support plates 90 connected to side walls 40 and/or rear wall 38 of housing 30, for example. Support plates 90 may be disposed perpendicular to filter screen 80 and in a vertically spaced arrangement to contact and structurally support concave side 88 of filter screen 80 and to aid in preventing buckling or other shape distortion of filter screen 80 in use. Support plates 90 may include edges 92 having a plurality of recesses 94, such as scallops, for example, with each recess 94 defined between a pair of projecting contact points 96 that engage concave side 88 of filter screen 80 to support and brace filter screen 80 while also facilitating removal of filter screen 80 from housing 30 when particulate material may become lodged within openings 82 of filter screen 80 as described below. Support plates 90 may also include one or more openings 98 therein to promote fluid flow through outlet chamber 64 toward outlet opening 48, with openings 98 formed in a circular or other shape. Openings 90 may be spaced from recesses 94 and may be formed as fully defined openings or may be formed as recesses disposed facing and adjacent side walls 40 and/or rear wall 38 of housing 30.

Referring to FIGS. 7A and 8, walls 84 of filter screen 80 may include flanges 100 extending longitudinally along the outer edges of walls 84 which engage side support rails 102 formed on side walls 40 of housing 30. Walls 84 of filter screen 80 may also include lower edges 104 in contact with bottom wall 66 of outlet chamber 64 and with a pair of angled lower support rails 106 formed on bottom wall 66. Additionally, ramped guide surfaces 110 may be formed on side walls 40 of housing 30 and/or bottom wall 66 of outlet chamber 64 for receiving and guiding lower edges 104 of filter screen 80 upon installation of filter screen 80 in the manner described below.

Referring to FIG. 8, with lid 68 of housing 30 removed, filter screen 80 may be installed by inserting filter screen 80 axially downwardly within housing as shown in FIG. 8 by engaging flanges 100 of filter screen 80 with support rails 102 and eventually engaging lower edges 104 of filter screen 80 with ramped guide surfaces 110 until lower edges 104 engage bottom wall 66 and lower support rails 104. Thereafter, as discussed above, lid 68 may be secured to flange 70 of housing 30 with bolts 72 in a manner in which upper edges 108 of filter screen 80 are in engagement with, or disposed closely adjacent, the interior surface of lid 68 to capture filter screen 80 within housing 30 such that filter screen 80 extends across the full interface between inlet chamber 62 and outlet chamber 64.

Referring to FIGS. 4-6A, strainer device 28 may also include a deflector plate 112 mounted within inlet chamber 62 at upper end 32 of housing 30 at a location in which deflector plate 112 is adjacent to inlet opening 44 and disposed directly within the fluid flow path between inlet opening 44 and filter screen 80. Deflector plate 112 may be made of a relatively thick metallic material, such as stainless steel or an abrasion resistant steel such as AR 235, AR 400, AR 450, AR 500 or AR 600 steel plate. Deflector plate 112 has an area exposed within the fluid flow path which may be coextensive, or slightly greater than, the area defined by the diameter of inlet opening 44 to thereby ensure that a majority, or substantially all, of the fluid flow through inlet opening 44 impinges directly upon deflector plate 112. Deflector plate 112 may include a plurality of openings 114 therein for allowing some passage of fluid directly through deflector plate 112 to directly contact the upper portion of filter screen 80.

In use, referring to FIGS. 1, 2 and 5, water flows from water source 24 and supply conduit 22 through inlet 42 and inlet opening 44 into inlet chamber 62, and thence through filter screen 80, outlet opening 48 and outlet 46 to manifolds 18 and spray nozzles 20 of vibrating screen device 12. The fluid flow includes entrained particulate matter and, as shown by the arrows in FIG. 5, may initially contact deflector plate 112 to direct most of the fluid flow downwardly within inlet chamber 62, with some portion of the fluid flow proceeding directly through openings 114 in deflector plate 112 to contact the upper portion of filter screen 80. Also, coarse particulates may impinge upon deflector plate 112 and be directed downwardly with the fluid flow rather than directly contacting filter screen 80 to prevent damage to filter screen 80. In this manner, deflector plate 112 induces turbulent flow of fluid within inlet chamber 62, which allows larger particulates to become separated from the fluid flow by gravity and to collect within debris chamber 56.

Still referring to FIG. 5, the fluid flow eventually passes through filter screen 80, with further particulates impinging upon filter screen 80 and eventually becoming separated from the fluid flow by gravity to collect within debris chamber 56. In this manner, only very small particulates pass through openings 82 in filter screen 80 which have a size such that the particulates may pass through spray nozzles 20 without clogging or accumulating within spray nozzles 20. Advantageously, the angled shape of filter screen 80 tends to deflect particulates toward side walls 40 of housing 30 and away from the central portion of inlet chamber 62 to facilitate gravity separation of particulates from the fluid flow and deposition of the particulates in debris chamber 56. The fluid flow passing through filter screen 80 enters outlet chamber 64 and flows toward outlet 46, with fluid flow permitted between concave rear side 88 of filter screen 80 through recesses 94 in support plates 90, as well as through openings 98 in support plates 90.

In this manner, it will be appreciated that an interruption in substantially laminar fluid flow which would otherwise occur through supply conduit 22 is provided by strainer device 28, which induces turbulent fluid flow within inlet chamber 62 and through filter screen 80 to allow particulates to be blocked by filter screen 80 and accumulate within debris chamber 56. Purge valve 60 of debris chamber 56 may be periodically opened, either when strainer device 28 is exposed to fluid pressure, or otherwise, to allow water and accumulated debris to be flushed from debris chamber 56.

During use of strainer device 28, particulate materials having a size substantially corresponding to, or slightly larger than, openings 82 in filter screen 80 may potentially become lodged within openings 82 of filter screen 80. When filter screen 80 needs to be cleaned or changed, such as by monitoring a pressure differential between inlet and outlet pressure valves 76 and 78 in the manner described above, the fluid flow from water source 24 through supply conduit 22 is shut off and lid 68 of housing 30 is removed. Filter screen 80 may then be lifted axially upwardly out of housing 30 in the manner shown in FIG. 8, with recesses 94 of support plates 90 providing a clearance space for accommodating passage of any particulates which are lodged within openings 82 of filter screen 80, such that filter screen 80 may be lifted substantially directly axially upwardly and out of housing 30 for removal without the need to bend or otherwise distort the shape of filter screen 80. Filter screen 80 may then be cleaned of particulates and replaced as described above, or alternatively, a new filter screen 80 may be installed in the manner described above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A strainer device for use in removing particulate debris from a wash water stream in an aggregate processing system, the strainer device comprising:
   a vertically elongate housing including an inlet opening defining a fluid flow path into the housing, the inlet opening in fluid communication with an inlet chamber, an outlet opening in fluid communication with an outlet chamber, and two parallel guide rails extending vertically along an interior of the housing;
   a filter screen vertically removably inserted along the guide rails and disposed within the housing between, and separating, the inlet and outlet chambers, the filter screen including a plurality of openings, and having one of an angled shape and a curved shape, with a convex side and an opposite concave side, the convex side facing the fluid flow path of the inlet opening;
   a deflector plate positioned within the housing adjacent the inlet opening and disposed axially in front of the filter screen in a fluid flow direction, the deflector plate including a plurality of openings to induce turbulent flow of fluid within the inlet chamber; and
   at least one support flange disposed within the housing on the concave side of the filter screen, wherein the at least one support flange includes an edge contacting the concave side of the filter screen, the edge including a plurality of spaced recesses therein, the recesses disposed between spaced contact points in engagement with the concave side of the filter screen.

2. The strainer device of claim 1, wherein the support flange further includes at least one opening therein which is spaced from the edge.

3. The strainer device of claim 1, wherein the deflector plate defines an area at least co-extensive in size with the inlet opening, wherein a substantial portion of the fluid within the fluid flow path directly contacts the deflector plate upon passing through the inlet opening.

4. The strainer device of claim 1, wherein the filter screen is generally V-shaped with a pair of walls, the filter screen defining an angle between the walls of between 75 and 105 degrees.

5. The strainer device of claim 1, wherein the housing includes a debris chamber at a lower end thereof, the debris chamber in fluid communication with the inlet chamber and including a purge valve.

6. The strainer device of claim 5, wherein the lower end of the housing is tapered, the debris chamber defined within the tapered lower end of the housing with the purge valve disposed at the tapered lower end of the housing.

7. The strainer device of claim 1, wherein the inlet chamber, the outlet chamber, and the filter screen each extend vertically within the housing below a central axis of the inlet opening.

8. The strainer device of claim 1, further comprising a first pressure gauge in fluid communication with the inlet opening and a second pressure gauge in fluid communication with the outlet opening.

9. The strainer device of claim 1, wherein the deflector plate is formed of a material selected from the group consisting of stainless steel and an abrasion resistant steel selected from the group consisting of AR 235, AR 400, AR 450, AR 500 and AR 600.

10. The strainer device of claim 1, wherein the filter screen is formed of a material selected from the group consisting of steel, stainless steel, and abrasion resistant steel.

11. The strainer device of claim 1, wherein the filter screen has a thickness of ⅛ to ¼ inches.

12. The strainer device of claim 1, wherein the plurality of openings in the filter screen have a diameter of 1/16 to ½ inches.

13. The strainer device of claim 1, wherein a diameter of the openings in the deflector plate is larger than a diameter of the openings in the filter screen.

14. The strainer device of claim 1, further comprising an openable and closable purge valve disposed at a lower end of the housing.

15. The strainer device of claim 1, further comprising a guide surface at a lower portion of each of the at least two guide rails and including a ramped surface configured to guide the filter screen into place during assembly.

* * * * *